(12) United States Patent
Brown

(10) Patent No.: US 10,093,244 B1
(45) Date of Patent: Oct. 9, 2018

(54) VISIBLE AUTO IDENTIFICATION DEVICE, SYSTEM, AND METHOD

(71) Applicant: Hugh Brown, Titusville, FL (US)

(72) Inventor: Hugh Brown, Titusville, FL (US)

( * ) Notice: Subject to any disclaimer, the term of this patent is extended or adjusted under 35 U.S.C. 154(b) by 0 days.

(21) Appl. No.: 15/662,509

(22) Filed: Jul. 28, 2017

Related U.S. Application Data

(60) Provisional application No. 62/367,862, filed on Jul. 28, 2016.

(51) Int. Cl.
*B60R 11/00* (2006.01)
*G09F 1/10* (2006.01)

(52) U.S. Cl.
CPC .......... *B60R 11/00* (2013.01); *G09F 1/10* (2013.01); *B60R 2011/001* (2013.01); *B60R 2011/0059* (2013.01); *B60R 2011/0063* (2013.01); *B60R 2011/0075* (2013.01)

(58) Field of Classification Search
CPC .......... B60R 13/10; B60R 13/105; B60R 2011/0059; B60R 2011/001; B60R 11/00; A45C 2001/065; A45C 11/182; G09F 1/10
See application file for complete search history.

(56) References Cited

U.S. PATENT DOCUMENTS

| | | | | |
|---|---|---|---|---|
| 1,483,592 A | | 2/1924 | Pelstring | |
| 1,576,703 A | * | 3/1926 | Anderson | B60R 13/105 40/593 |
| 1,674,406 A | * | 6/1928 | Lynch | B60R 13/10 224/276 |
| 1,680,998 A | | 8/1928 | Krantz | |
| 1,730,790 A | | 10/1929 | Squires | |
| 1,844,311 A | * | 2/1932 | Cobbs | B60R 13/10 150/149 |
| 1,976,261 A | * | 10/1934 | Kinkead | B60R 7/04 40/643 |
| 2,027,517 A | | 1/1936 | Cobbs | |
| 2,422,432 A | * | 6/1947 | Miller | A45C 1/06 150/132 |
| 2,887,216 A | | 5/1959 | Hargraves | |
| 3,018,532 A | * | 1/1962 | Rinaldi | B42F 5/00 150/149 |
| 3,299,929 A | * | 1/1967 | Shagin | A45C 1/06 150/138 |
| 3,313,053 A | | 4/1967 | Vogeli, Sr. | |
| 4,055,012 A | * | 10/1977 | Cote | G09F 3/20 40/374 |
| 4,444,343 A | | 4/1984 | Perlsweig | |

(Continued)

OTHER PUBLICATIONS

ACLU.org "bustcard"; Jul. 24, 2015; http://web.archive.org/web/20150724123526/https://www.aclu.org/sites/default/files/field_document/bustcard_eng_20100630.pdf (Year: 2015).*

*Primary Examiner* — Charles A Fox
*Assistant Examiner* — Christopher E Veraa
(74) *Attorney, Agent, or Firm* — Brian S. Steinberger; Law Offices of Brian S. Steinberger, P.A.

(57) ABSTRACT

Holders, devices and methods for storing identification information, such as but not limited to driver's licenses, insurance and vehicle registration and safety tip information for quick and easy retrieval from storage containers that can be mounted in easy to reach and clearly visible locations for vehicle drivers, such as but not limited to being mounted on steering wheel columns, where the storage locations are clearly visible to outside law officers approaching a vehicle.

11 Claims, 11 Drawing Sheets

(56) References Cited

U.S. PATENT DOCUMENTS

| | | | |
|---|---|---|---|
| 4,512,504 A | 4/1985 | Owlett | |
| 4,741,372 A * | 5/1988 | Santilli | A45C 11/182 150/137 |
| 4,805,680 A * | 2/1989 | Ueno | A45C 11/182 150/145 |
| 4,913,326 A | 4/1990 | Echelson | |
| 4,932,520 A | 6/1990 | Ciarcia et al. | |
| 4,962,874 A | 10/1990 | Hagglund | |
| 5,170,917 A * | 12/1992 | Tourigny | A45C 1/04 224/219 |
| 5,230,173 A * | 7/1993 | Riley | B42F 17/02 40/404 |
| D352,257 S | 11/1994 | Poline | |
| 5,386,933 A * | 2/1995 | Greene | A45F 3/50 224/219 |
| 5,431,316 A * | 7/1995 | Garcia | A45F 3/12 224/264 |
| 5,502,912 A | 4/1996 | Leboff et al. | |
| 5,505,358 A | 4/1996 | Haase | |
| 5,516,018 A * | 5/1996 | Eskandry | B60R 7/05 224/312 |
| 5,579,969 A * | 12/1996 | Brandell | A45F 3/50 224/277 |
| 5,586,707 A | 12/1996 | Haskell | |
| 5,755,366 A | 5/1998 | Mazzo | |
| 6,006,462 A * | 12/1999 | Lackomar | B60R 7/043 108/44 |
| 6,427,836 B1 * | 8/2002 | Bolanos | A45C 11/182 150/148 |
| 6,427,837 B1 * | 8/2002 | Shields | A45C 1/06 150/147 |
| 6,430,854 B1 | 8/2002 | Szentgyorgyi et al. | |
| 6,435,392 B1 | 8/2002 | Kennedy | |
| 6,446,374 B1 | 9/2002 | Ardiff | |
| 6,634,531 B2 | 10/2003 | Conte | |
| 6,644,694 B2 * | 11/2003 | Seawright | B42D 15/008 2/16 |
| 6,746,052 B1 * | 6/2004 | Reynolds | B42F 1/006 281/2 |
| 6,886,283 B2 * | 5/2005 | Arraut | G09F 3/20 150/147 |
| 7,308,771 B2 * | 12/2007 | Memelink | G09F 3/20 150/147 |
| 7,930,846 B2 | 4/2011 | Barnard | |
| 8,776,846 B1 * | 7/2014 | Thompson | A45C 11/182 150/138 |
| 8,991,670 B2 | 3/2015 | Matsuoka et al. | |
| 9,756,913 B1 * | 9/2017 | Zepeda | A45C 1/06 |
| 2004/0113397 A1 | 6/2004 | Lecoq | |
| 2010/0116702 A1 | 5/2010 | Schentrup et al. | |
| 2010/0243515 A1 * | 9/2010 | Mish | A45C 13/02 206/701 |
| 2010/0326865 A1 * | 12/2010 | Maistrellis | B42F 21/00 206/459.5 |
| 2011/0186195 A1 * | 8/2011 | Cohen | A45C 1/06 150/139 |
| 2011/0284416 A1 | 11/2011 | Sowers | |
| 2011/0297714 A1 | 12/2011 | Freeman | |
| 2013/0020211 A1 * | 1/2013 | Schneider | A45C 1/06 206/232 |
| 2013/0170938 A1 | 7/2013 | Lowden | |
| 2013/0292434 A1 | 11/2013 | Wright | |
| 2014/0131403 A1 | 5/2014 | Wright | |

* cited by examiner

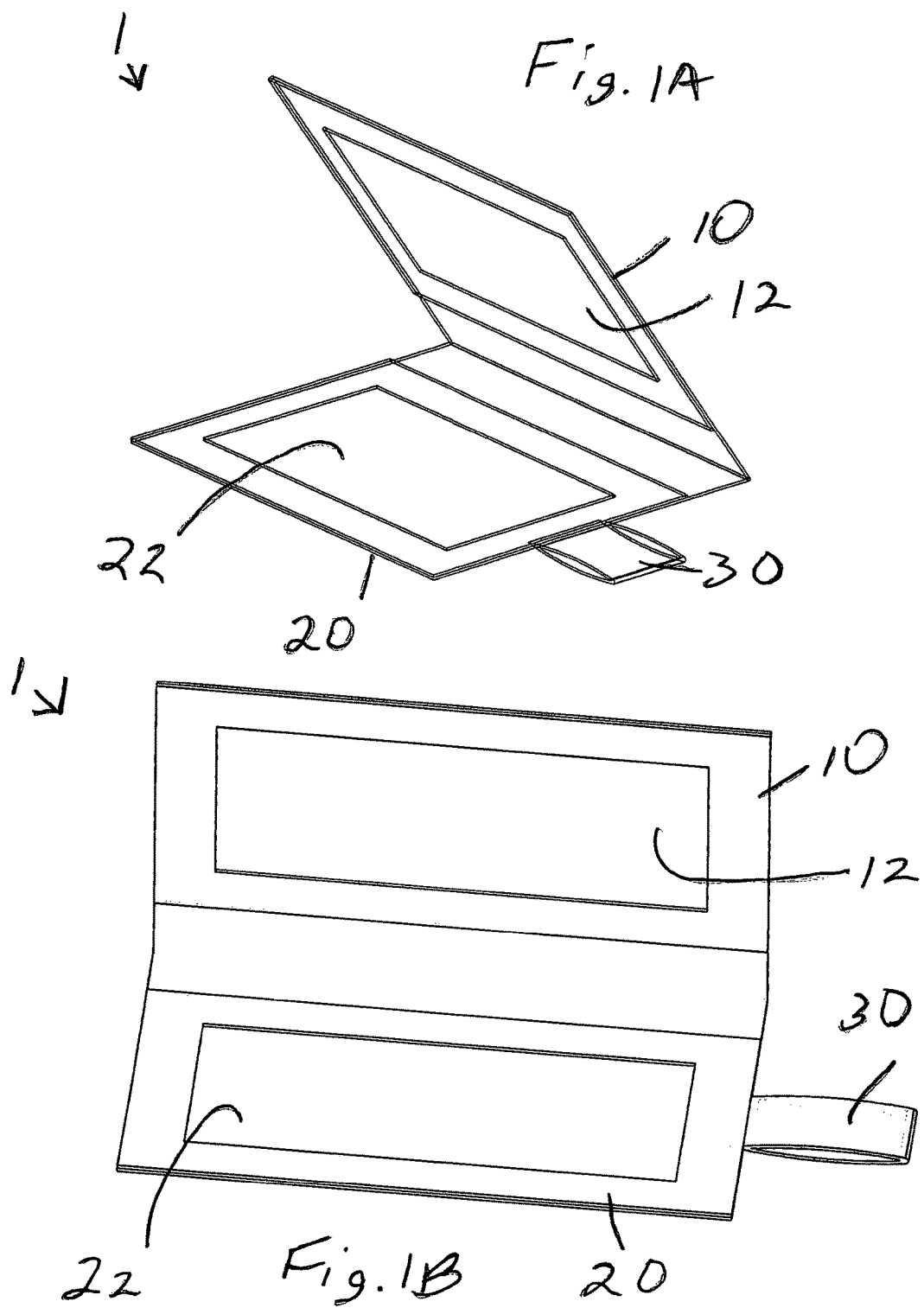

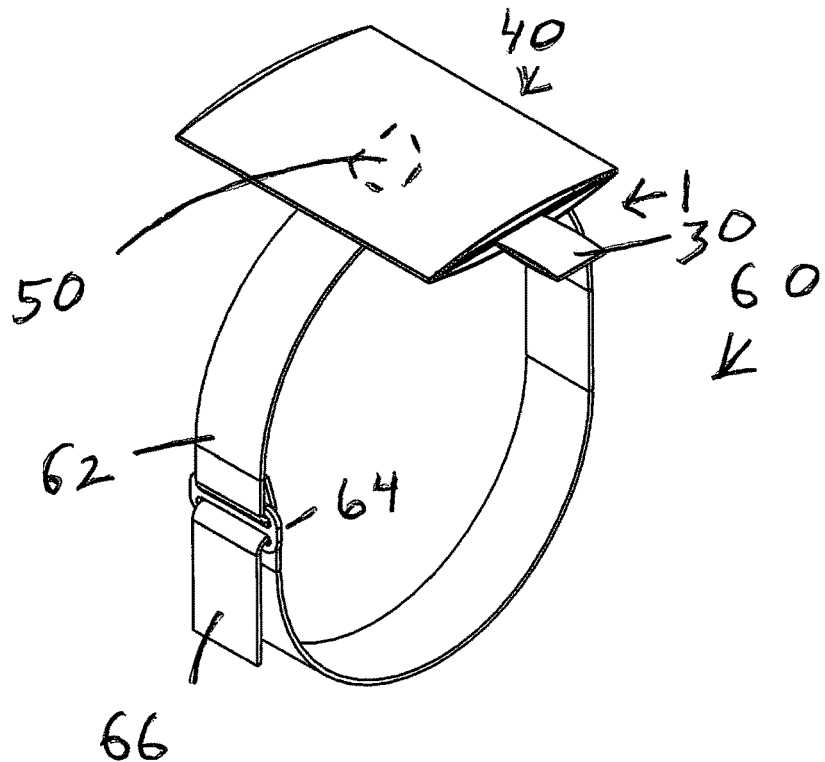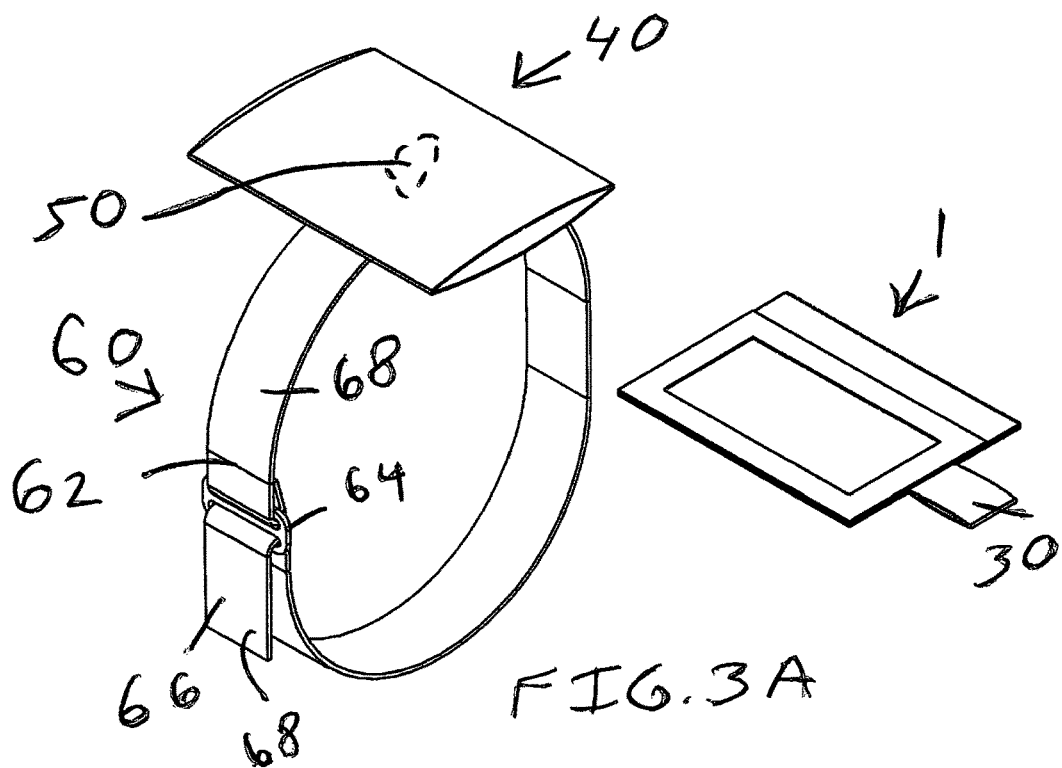

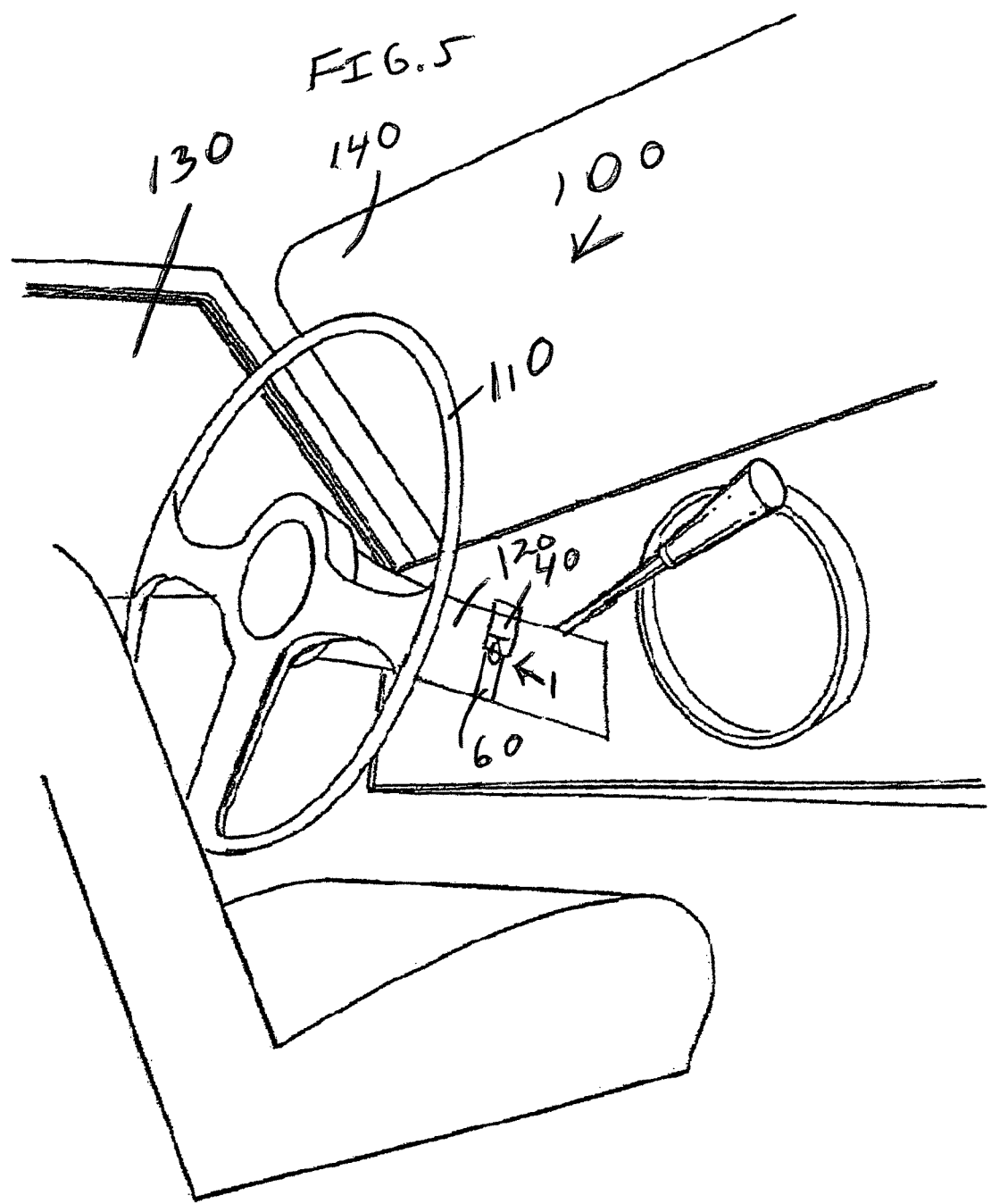

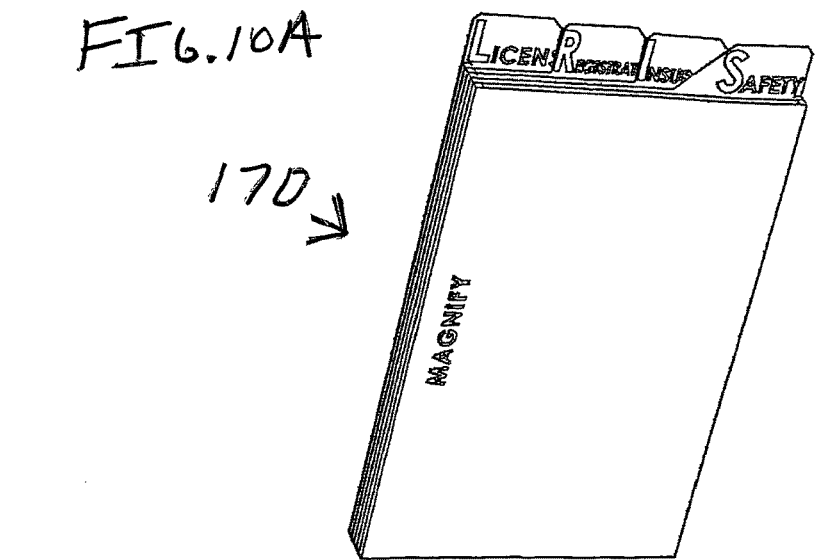
FIG.10A
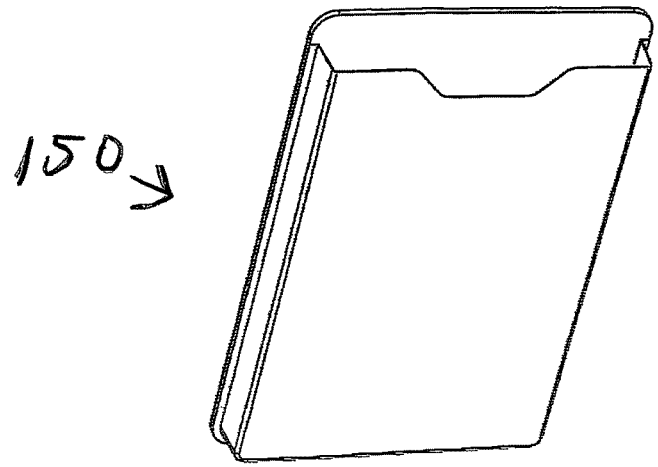
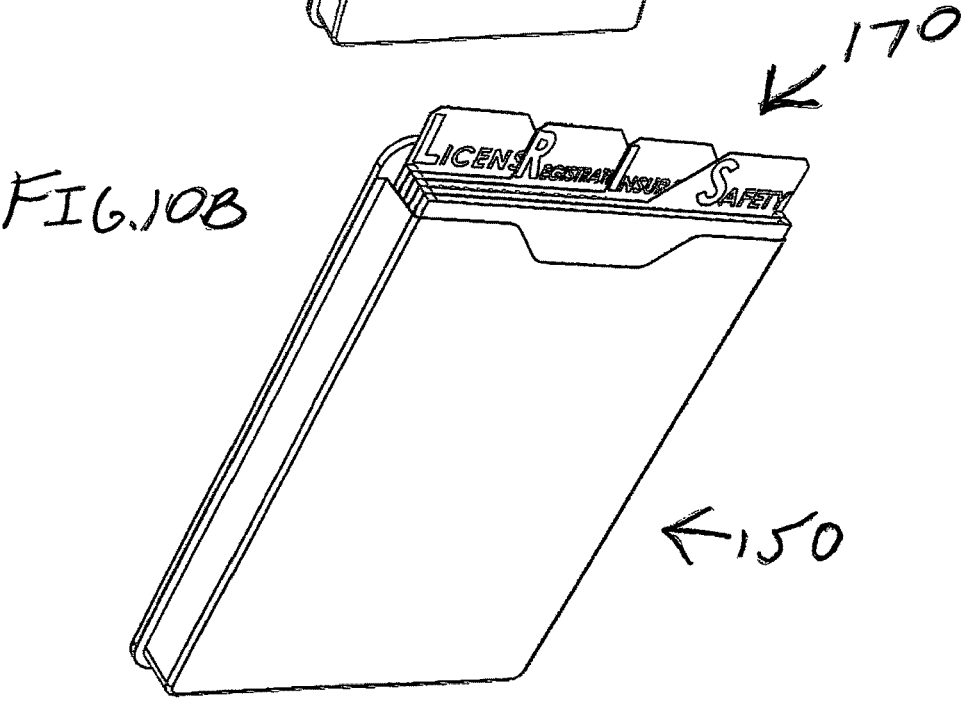
FIG.10B

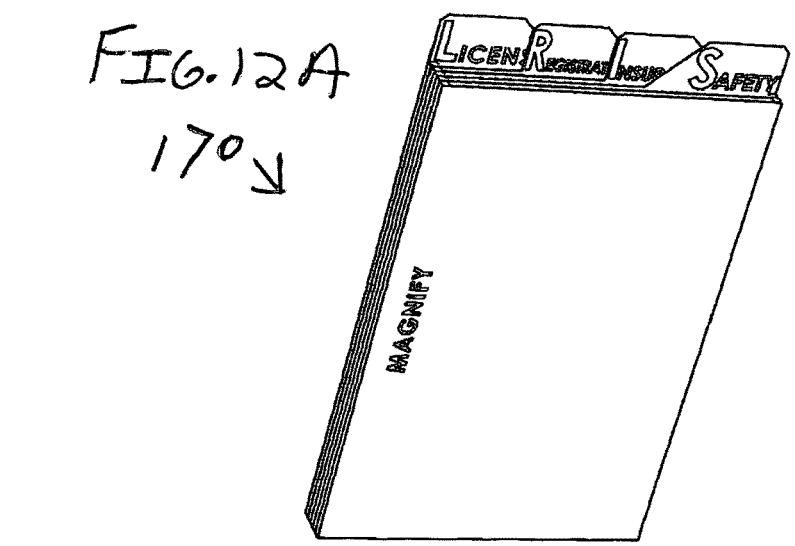
FIG.12A
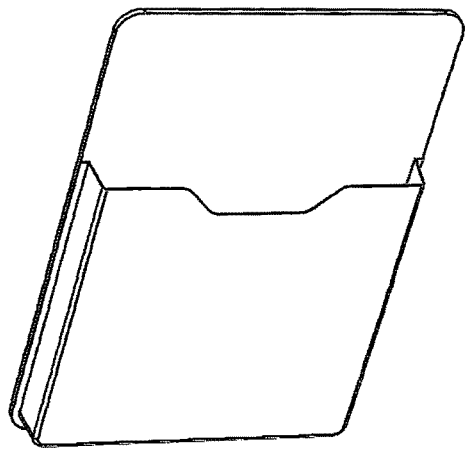
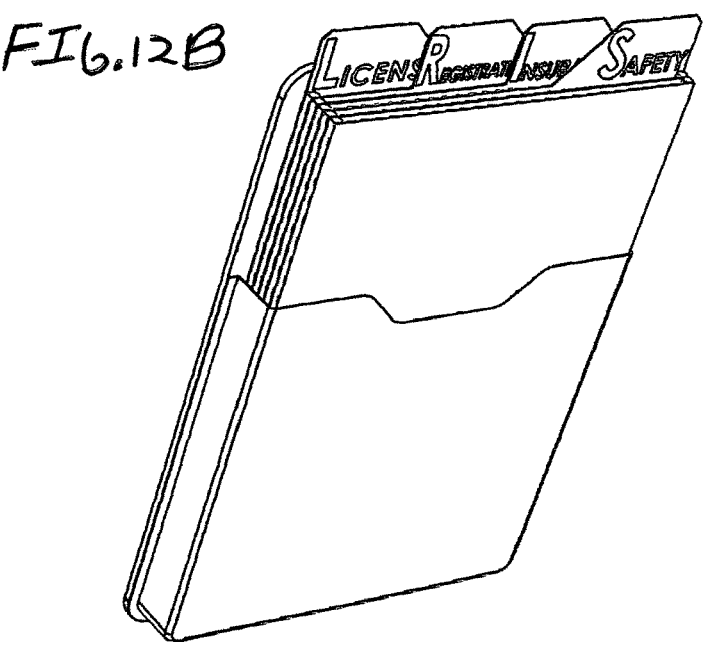
FIG.12B

VISIBLE AUTO IDENTIFICATION DEVICE, SYSTEM, AND METHOD

This application claims the benefit of priority to U.S. Provisional Patent Application Ser. No. 62/367,862 filed Jul. 28, 2016, the entire disclosure of which is incorporated by reference in its' entirety.

FIELD OF INVENTION

This invention relates to accessing identification information, and in particular to holders, devices and methods for storing identification information, such as but not limited to driver's licenses, insurance and vehicle registration and safety information that can be stored in transparent sleeves, for easy retrieval from storage containers that can be mounted in easy to reach locations for vehicle drivers, such as being mounted on top of steering wheel columns, where the storage locations are clearly visible to outside law officers approaching a vehicle.

BACKGROUND AND PRIOR ART

There have been numerous cases of motor vehicle traffic stops by law enforcement which have resulted in serious injuries and even death. Generally, law enforcement officers have become increasingly suspicious when approaching a vehicle that may have just been stopped for an alleged traffic violation, such as speeding, expired registration, and the like. During these stops, law enforcement officers approaching the driver's side or passengers side of the vehicle need to request identification documentation from the driver and/or passenger(s). This request for identification documentation generally requires the driver and/or the passenger to have to reach into their pants pockets or shirt pockets, or jackets or under their seats or into their glove boxes to obtain their identification documentation.

Depending upon the circumstances, whether it be at night, at lonely stretches of the road, etc. the law enforcement officers can become increasingly suspect of the driver and/or passenger intentions. This suspicion can be heightened when the law enforcement officers are not able to see the hands of the driver and/or passenger while they reach to retrieve their identification documentation.

In recent years there have been an increasingly amount of serious harmful accidents have occurred where the officers shot and either injured or killed the driver or the front seat passenger based on misreading the driver and/or the passenger's intentions. This heightened sense of suspicion by officers has increased substantially in recent years based on mistakes by the law enforcement officers when interpreting the actions of drivers and/or their passengers that are stopped. Also, this heightened sense of suspicion by law enforcement has also increased based on the increasing amount of harmful attacks on law enforcement officers, as well as the increase in persons possessing firearms on or near their person.

The conflict that occurs is that the driver and/or front passenger needs to provide identification documentation promptly to the law enforcement officer in a safe manner without being shot, and without raising the suspicion that they are a threat to the law enforcement officers by allowing their hands remain visible during the retrieval of the identification documentation.

Thus, the need exists for solutions to the above problems with the prior art.

SUMMARY OF THE INVENTION

A primary objective of the present invention is to provide holders, devices and methods for storing identification documentation, such as but not limited to driver's licenses, insurance and vehicle registration, for easy retrieval from storage containers that can be mounted in easy to reach locations for vehicle drivers, such as being mounted on top steering wheel columns/posts, and the like.

A secondary objective of the present invention is to provide for easy retrieval of identification documentation, such as driver's licenses, insurance and vehicle registration, from a driver or passenger, from easy to retrieve locations clearly visible to law enforcement officers outside of the vehicle, which allows the retriever's hands to remain continuously visible to the officer.

A third objective of the present invention is to provide for easy retrieval of identification documentation, such as driver's licenses, insurance and vehicle registration, from a driver or passenger, without storing the identification documentation in a non-visible location to a law enforcement officer outside of the vehicle, such as under the seat, in one's pocket(s) or in a glove box, and the like.

A fourth objective of the present invention is to provide for easy retrieval of safety information for a driver or passenger to provide information on what to do when being stopped by a law enforcement officer, where the safety information is easily retrievable by the driver or passenger, and the storage of the safety information is clearly visible to a law enforcement officer approaching the vehicle.

The invention can allow for driver identification documentation that includes a driver's license, insurance card and vehicle registration card to be stored in transparent sleeves of a card holder that can include a bifold holder, tri-fold holder, four-fold holder, and the like. The card holder can be insertable and removable from a base cover type sleeve, where a tab on the card holder allows for easy retrieval of the card holder from the base cover sleeve.

A fastener, such as but not limited to a hook and loop fastener can allow for a base cover which holds removable bifold or trifold card sleeves to be easily mounted at different orientations to the top of a length adjustable strap that can be wrapped about a steering column of a vehicle. The base cover can be mounted in a location on top of the strap that is wrapped about the steering wheel post/column that is both easily reachable by the driver, as well as be visible to anyone approaching the driver's side or passenger side of the vehicle, and the location will allow the driver retrieving the vehicle identification cards to have their hands remain completely visible during retrieval of the vehicle identification cards.

An officer observing the driver or passenger retrieving the card holder with vehicle identification information cards can remain confident of a safe environment to complete their required inquiry and disposition of the card retrieval. The invention promotes increased safety for both the law enforcement officers and vehicle drivers and vehicle passengers.

Further objects and advantages of this invention will be apparent from the following detailed description of the presently preferred embodiments which are illustrated schematically in the accompanying drawings.

BRIEF DESCRIPTION OF THE FIGURES

FIG. 1A is a perspective view of a bifold version of the card holder.

FIG. 1B is another perspective view of the bifold card holder of FIG. 1A.

FIG. 3A is an exploded view of the bifold card holder of the preceding FIGURES about to be inserted into the base cover attached to an adjustable strap.

FIG. 3B is an assembled view of the bifold card holder of FIG. 3A inserted into the base cover sleeve with strap.

FIG. 5 is another perspective view of the assembled bifold card holder in base cover sleeve of FIG. 3B strapped around a steering wheel column/post with the cards extending sideways to the right of the steering wheel column/post.

FIG. 10A is an exploded view of the closed four folder card holder of FIG. 9B about to be inserted into the second base cover sleeve of FIGS. 6A-6B.

FIG. 10B is an assembled perspective view of the four-folder card holder inserted into the second base cover sleeve of FIG. 10A.

FIG. 12A is an exploded view of the closed four card holder of FIG. 9B about to be inserted into the third base cover sleeve of FIGS. 11A-11B.

FIG. 12B is an assembled perspective view of the closed four card holder inserted into the third base cover sleeve of FIG. 12A.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 2A:
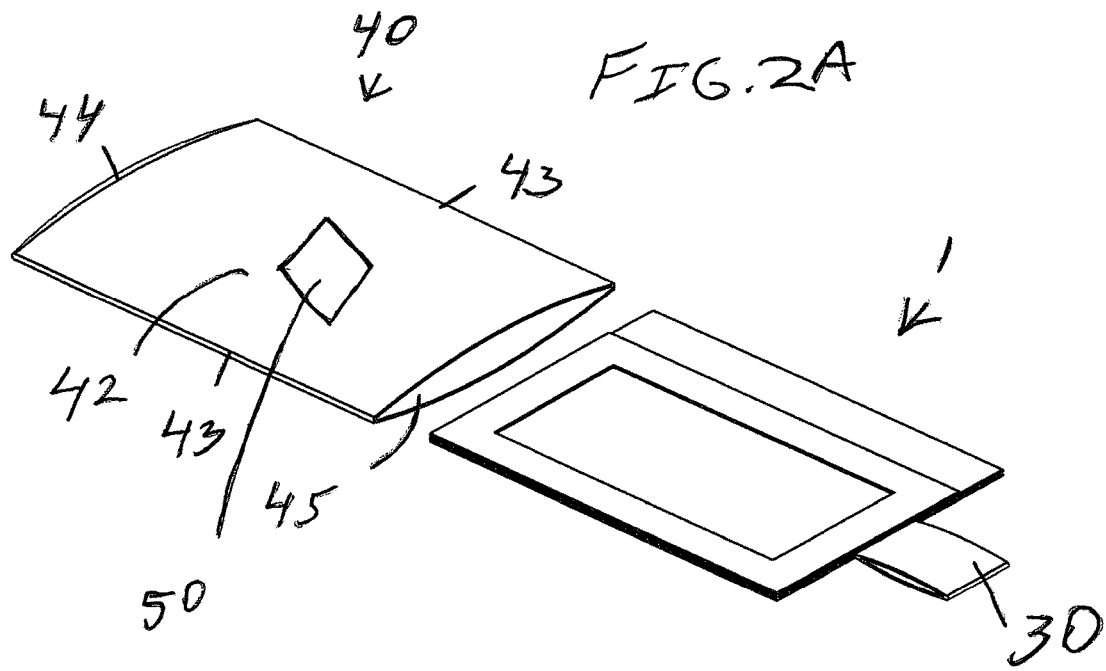
FIG. 2A is an exploded perspective view of the bifold card holder of FIGS. 1A-1B in a folded position to be inserted into a base cover (sleeve) of FIGS. 1A-1B.
Figure 2B:
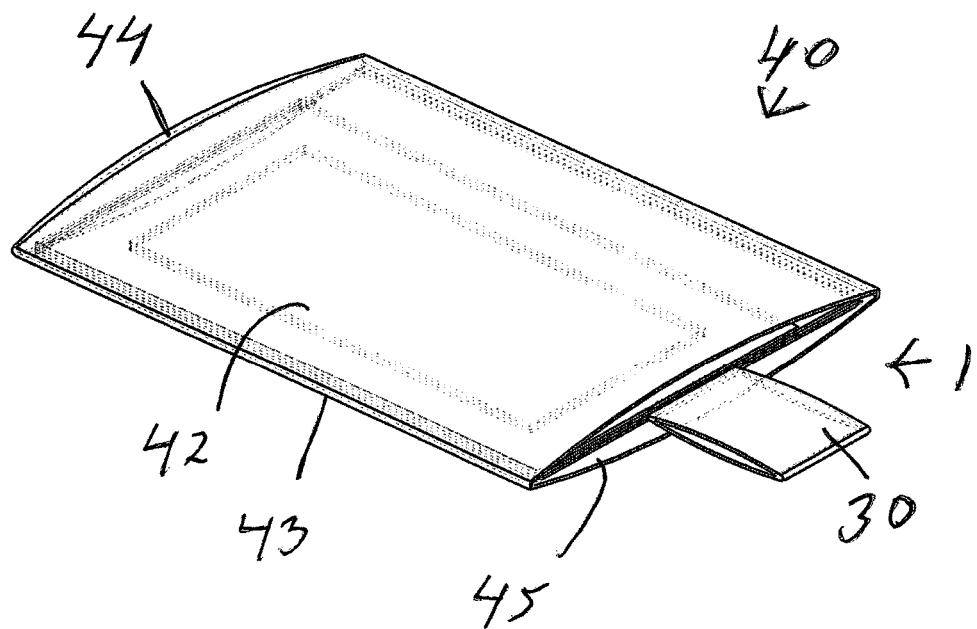
FIG. 2B is a perspective view of the folded bifold card holder of FIG. 2A inserted into the base cover (sleeve).

A list of components will now be described.
1 Bifold
10 first sleeve
12 first transparent window
20 second sleeve
22 second transparent window
30 pull tab
40 base holder
42 front face/rear face
43 sides
44 bottom
45 open end
50 fastener
60 strap
62 first end
64 length adjustable buckle loops
66 second free end
68 hooks and loops
100 vehicle
110 steering wheel
120 steering wheel post/column
130 driver side window
140 front window of vehicle
150 second base cover
152 front wall
153 small recess on top of front wall
154 rear wall
160 four-fold sleeves
162 license sleeve with tab end and recess
164 registration card sleeve with tab end and recess
166 insurance card sleeve with tab end and recess
168 safety tips card sleeve with tab end and recess
170 four-fold sleeves
171 flap with magnifier transparent plastic lens to enlarge images
172 license sleeve with tab end and recess
174 registration card sleeve with tab end and recess
176 insurance card sleeve with tab end and recess
178 safety tips card sleeve with tab end and recess
180 third base cover
182 front wall
183 small recess on top of front wall
184 rear wall FIG. 1A is a perspective view of a bifold version of the card holder 1. FIG. 1B is another perspective view of the bifold card holder 1 of FIG. 1A. FIG. 2A is an exploded perspective view of the bifold card holder 1 of FIGS. 1A-1B in a folded position to be inserted into a base cover (sleeve) 40 of FIGS. 1A-1B. FIG. 2B is a perspective view of the folded bifold card holder 1 of FIG. 2A inserted into the base cover 40.

Referring to FIGS. 1A-2B, the bifold card holder 1 can have two sleeves 10, 20, hinged to one another, and having at least front transparent faces 12, 22 that allow for the contents in the sleeves 10, 20 to be visible therefrom. Each of the sleeves 10, 20 can have closed sides, bottom and front and rear faces with an open slit that allows for card shaped identification documents that can include a driver's license, insurance card and registration card to be inserted inside. The bifold can also allow for the card shaped identification documents to be stored inside one of the sleeves 10 while the other sleeve 20 is used to old currency and the like. Extending from one end of the sleeves 10, 20 can be tab 30 which can be used as a pull tab. The sleeves 10, 20 can be made from plastic, nylon, vinyl, leather, and fabric, and the like.

The base cover 40 can have a slightly larger dimension than the sleeves 10, 20. The base cover can have a sleeve shape with front and rear faces 42, closed sides 43, closed bottom 44, and open end 45 which is large enough to allow for the folded bifold holder 1 to be inserted therein. Once inserted the bifold 1 can be retrieved by pulling it out of the base cover 40 with the pull tab 30. The base cover 40 can be made from plastic, nylon, vinyl, leather, and fabric, and the like. The front and/or rear faces 42 can be transparent so that the stored sleeves 10 of the bifold is visible inside or be opaque. On one of the front or rear faces of the base cover 40 can be a reusable fastener 50, such as hook and loop fasteners, snap fasteners, self-stick surface, and the like.

FIG. 3A is an exploded view of the bifold card holder 1 of the preceding FIGURES about to be inserted into the base cover 40 attached to an adjustable strap 60. FIG. 3B is an assembled view of the bifold card holder 1 of FIG. 3A inserted into the base cover sleeve 40 with strap 60.

Referring to FIGS. 1A-3B, the underside of the base cover 40 can be removably attached to a side portion of the strap 60 with a reusable fastener 50. The reusable fastener 50 allows for the base cover to be attached in different positions relative to the strap 60, which will be described in greater detail in FIGS. 4-5. The first strap end 62 with length adjustable buckle loops 64 which can receive the inserted second free end 66 of the strap 60 which can adjust the strap 60 to different steering wheel post diameters. Alternatively, the strap 60 can have ends with hooks and loops 68 which can also be used to adjust the strap 60 to different steering wheel post diameters.

Figure 4:
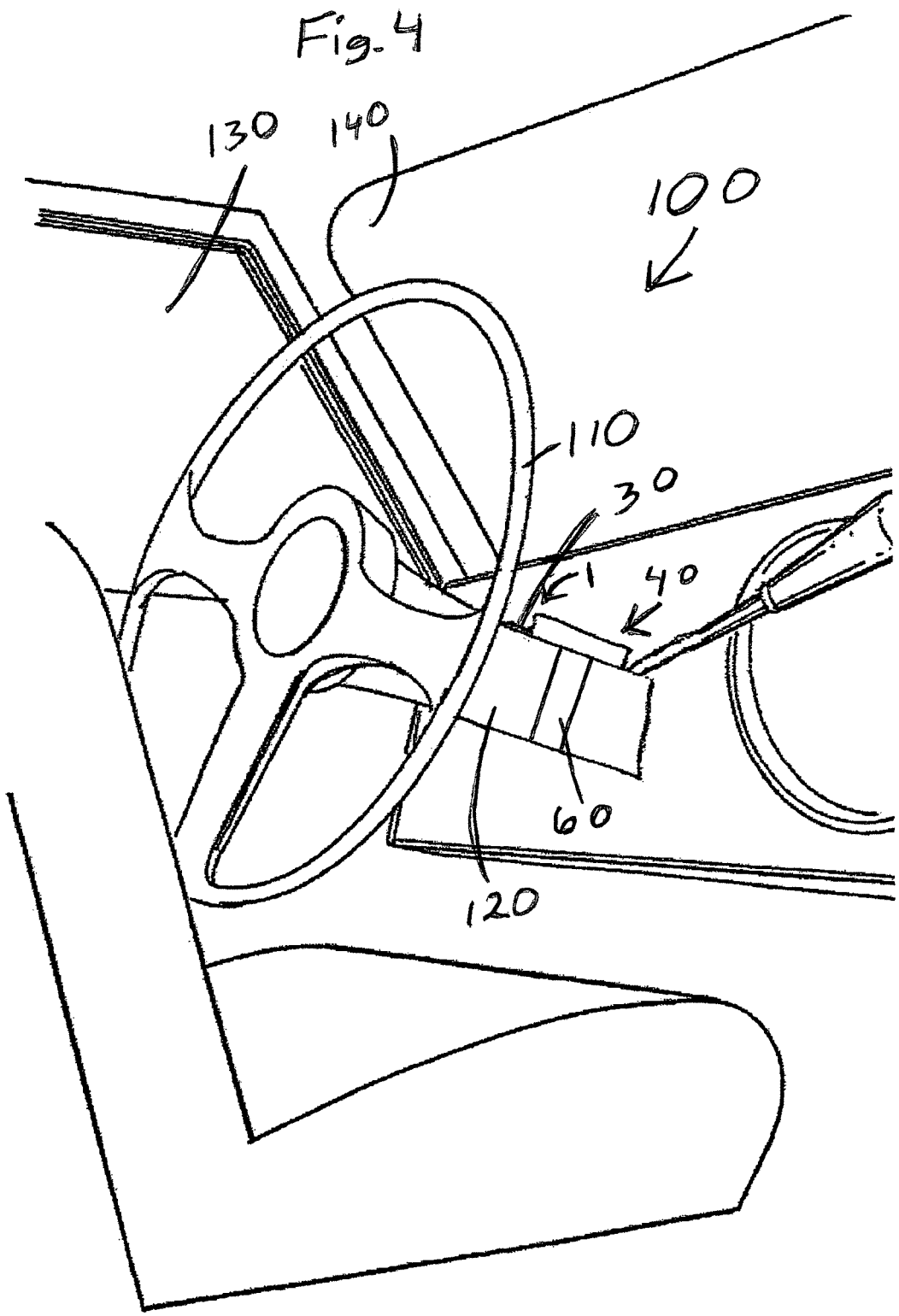
FIG. 4 is a perspective view of the assembled bifold card holder in base cover sleeve of FIG. 3B strapped around a steering wheel post/column, with cards extending toward the steering wheel.

FIG. 4 is a perspective view of the assembled bifold card holder 1 in base cover sleeve 40 of FIG. 3B strapped around a top of the steering wheel post/column 120 with length adjustable straps, with card holder 1 and pull tab 30 extending toward the steering wheel 110. In use, a law enforcement approaching the vehicle 100 can see the drivers hand(s) when the driver is retrieving the card holder 1 from the base cover 40. The location of the bifold card holder 1 with and base cover 40 on top of the steering wheel post/column 120 would be clearly visible through the driver side window 130 as well as the front window 140 of the vehicle.

The reusable fastener 50 allows for the driver to easily remove the card holder 1 and base cover 40 when the vehicle stops, so that the card holder 1 and base cover 40 can easily be place in one's pocket for safe keeping and when traveling on foot.

FIG. 5 is another perspective view of the assembled bifold card holder 1 in base cover sleeve 40 of FIG. 3B strapped around a steering wheel column/post 120 with the pull tab 30 on the bifold card holder extending sideways to the right of the steering wheel column/post 120. Similar to FIG. 4, the location of the bifold card holder 1 with and base cover 40 on top of the steering wheel post/column 120 would be clearly visible through the driver side window 130 as well as the front window 140 of the vehicle. In FIG. 5, a right-hand driver can easily pull on tab 30 to remove the bifold card holder 1 from the base cover 40. Still furthermore, the reusable fastener 50 can allow for the base cover 40 with removable bifold card holder 1 to have the pull tab 30 to face left from the top of the steering wheel post/column 120, which can be used for left hand drivers.

While the preferred embodiment allows for a reusable fastener 50 to attach the card holder 1 and base cover 40 on top of a strap 60. The base cover can be fixably adhered to the top of the strap.

Figure 6A:
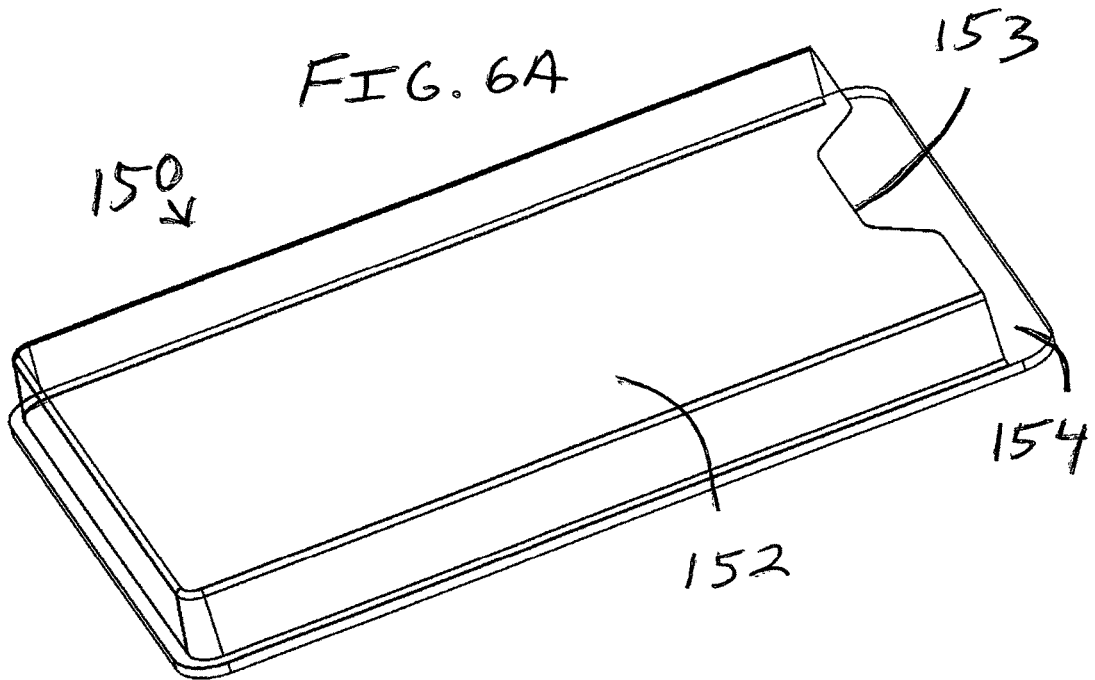
FIG. 6A is a perspective front view of a second base cover sleeve with small front recess.
Figure 6B:
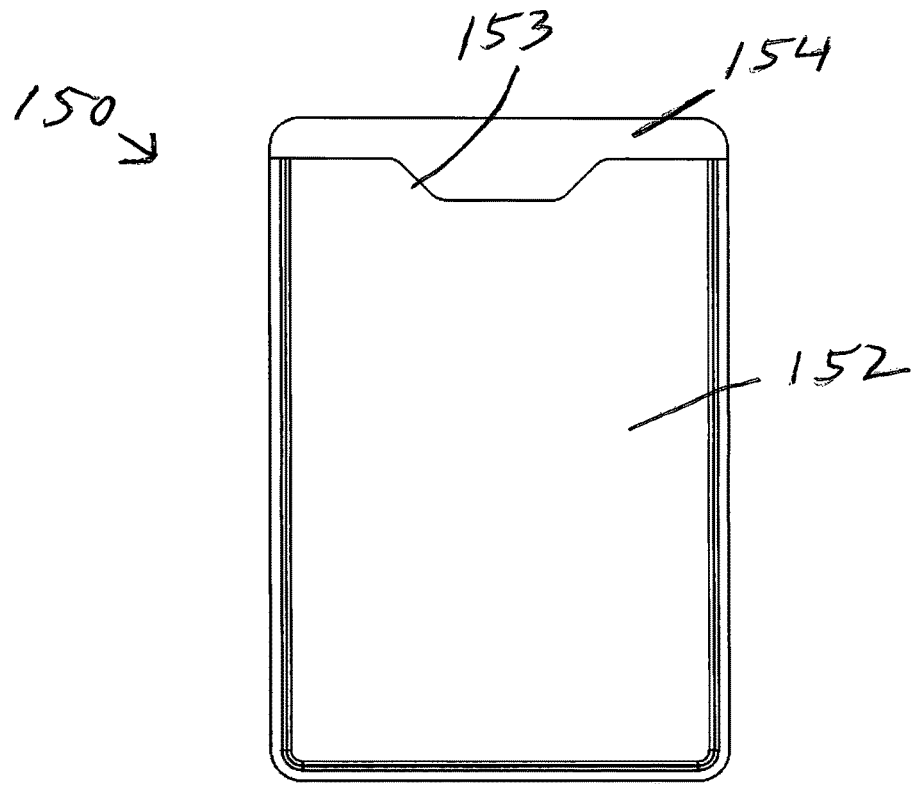
FIG. 6B is a front view of the base cover sleeve with small front recess of FIG. 6A.

FIG. 6A is a perspective front view of a second base cover sleeve 150 with a front face 152 having a small front recess 153. FIG. 6B is a front view of the base cover sleeve 150 with small front recess 153 of FIG. 6A. The base cover sleeve 150 has closed front face 152, rear face 154, closed sides and open end which allows for the card holders to be inserted into the open end. The small recess 153 allows for the driver to be able to grip the inserted card holder which will now be described.

Figure 7:
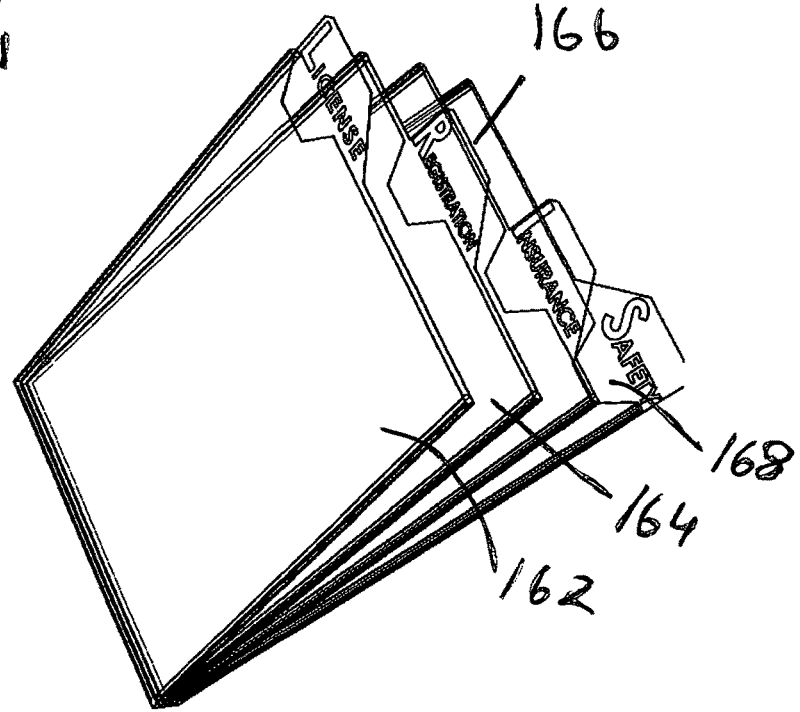
FIG. 7 is a perspective view of a four-folder card holder.

FIG. 7 is a perspective view of a four-folder card holder 160 that can include four transparent sleeves 162, 164, 166, 168 for supporting driver identification documents that include a driver's license, registration card, insurance card and a sleeve for safety tips for the driver, which will be described below. Each of the sleeves 162, 164, 166, 168 can be hinged together, and can have raised tab ends that can include labels for the license, registration, insurance and safety tips. Additionally, similar to the base cover 150, each of the sleeves 162, 164, 166, 168 can have a front wall with a recess that allows for the driver to easily pull their license, registration and insurance card from the sleeves.

Figure 8:
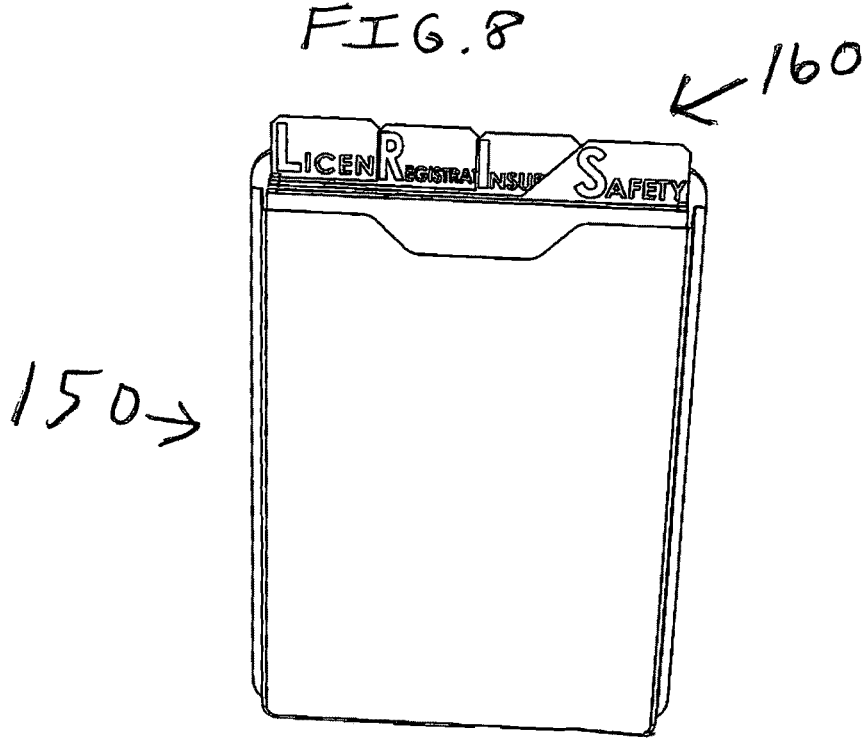
FIG. 8 is a front view of the four-folder card holder inserted into the second base cover sleeve of FIGS. 6A-6B.

FIG. 8 is a front view of the four-folder card holder 160 inserted into the second base cover sleeve 150 of FIGS. 6A-6B.

In a preferred application, when a vehicle is stopped by a law enforcement officer, the driver can put their hands on top of the steering wheel. When the officer requests driver's license, insurance card and registration card, the driver can then remove the four-folder card holder 160 from the base cover 150, which is attached to the top of the steering wheel post 120 by strap 60, as previously shown in FIGS. 4-5. This removal will allow the officer to see the driver's hands at all times.

The driver can hand the four-folder card holder 160 to the law enforcement officer, and the officer would have the complete package of a driver's license, insurance card and registration card. The transparent sleeves 162, 164, 166, 168 would allow the officer to easily be able to see the driver's license, insurance card and registration card without having to remove the cards from the sleeves. The labelled tabs on the sleeves clearly identify the driver's license, insurance card and registration card. Additionally, the recesses on top of each of the sleeves 162, 164, 166, 168 would also assist the officer in being able to easily extract the driver's license, insurance card and registration card from the sleeves.

The sleeve holder 160 would be restricted to those cards which would avoid the officer from having to request the driver remove their cards, which occurs when the driver has a traditional wallet that has currency, credit cards, and the like.

The sleeve holder 160 gives the driver peace of mind for safely and securely providing the necessary personal identification documents (driver's license, insurance card and registration card) to the officer, all while allowing the driver to keep their hands visible to the driver when the law enforcement officer approaches the vehicle and all the way through the driver providing the necessary personal identification documents to the officer.

Figure 9A:
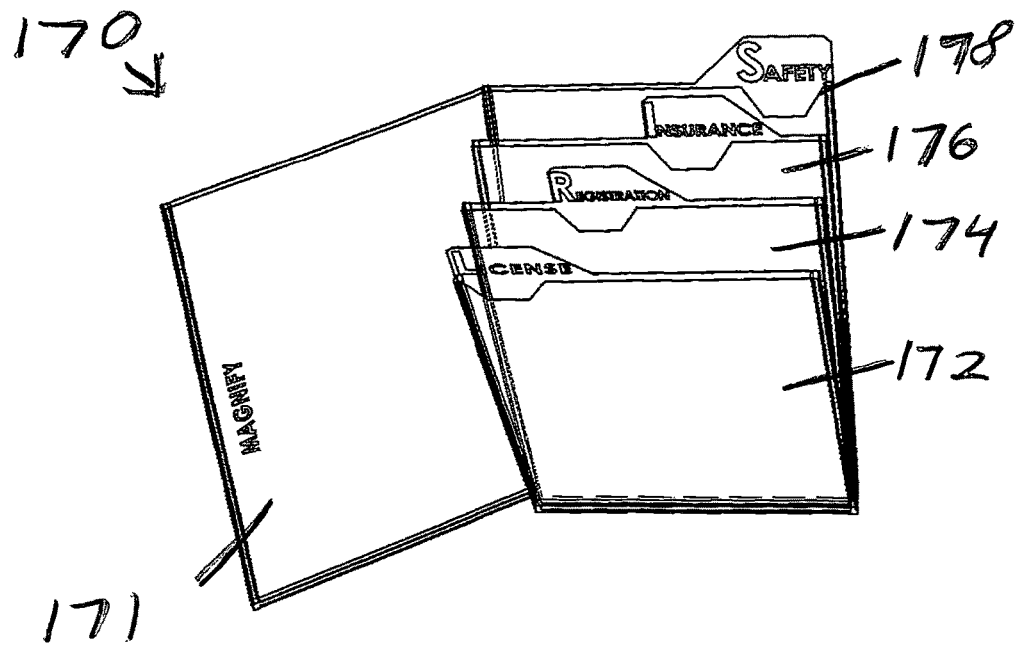
FIG. 9A is a perspective view of another four-folder card holder in an open position.

FIG. 9A is a perspective view of another four-folder card holder 170 in an open position having similar hinged transparent sleeves 172, 174, 176, 178 for holding a driver's license, registration card, insurance card, and safety tips with the sleeves hinged to one another. Similar to the previous sleeves, each of the sleeves 172, 174, 176, 178 can have labelled tab ends so as to easily located the desired identification cards and front wall recesses for allowing easy retrieval of the identification cards. In addition, a flap 171 can extend from the rear sleeve 178. The flap 171 can include a transparent plastic lens that can be used as a magnifier that can enlarge images, so that one looking through the magnifier to view any of the personal identification documents will be able view any small print, and the like.

Figure 9B:
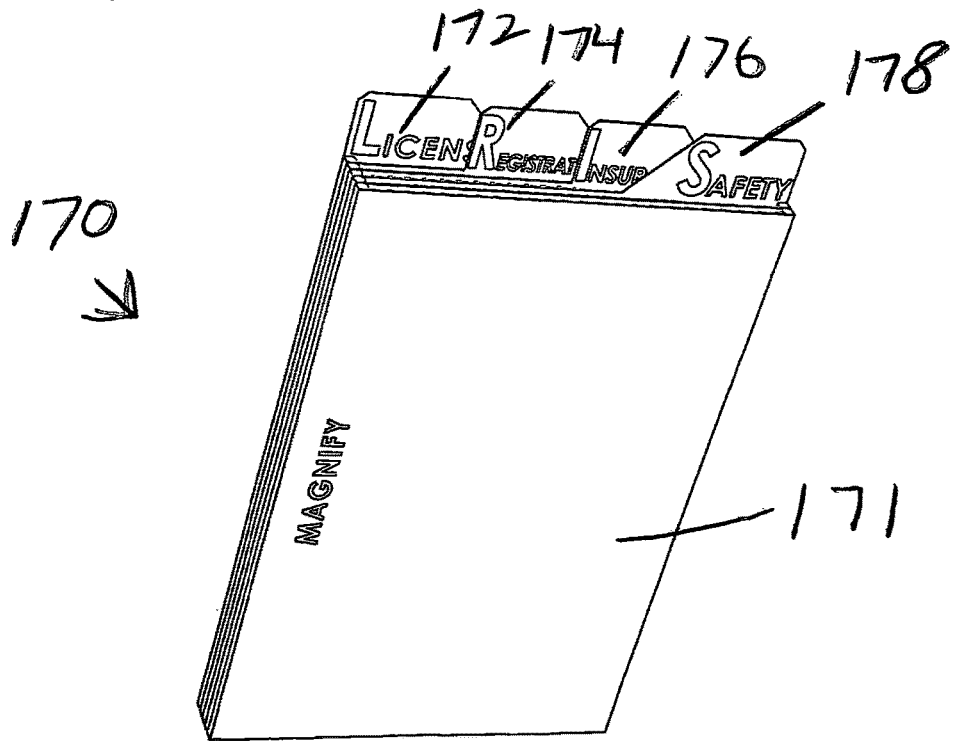
FIG. 9B is a perspective view of the four-folder card holder of FIG. 9A in a closed position.

FIG. 9B is a perspective view of the four-folder card holder of FIG. 9A in a closed position with the flap 171 folded across the front sleeve 172 which allows the card holder 170 to be more easily inserted into a base sleeve 150.

FIG. 10A is an exploded view of the closed four folder card holder 170 of FIG. 9B about to be inserted into the second base cover sleeve 150 of FIGS. 6A-6B. FIG. 10B is an assembled perspective view of the four-folder card holder 170 inserted into the second base cover sleeve 150 of FIG. 10A.

The closed four card holder 170 and base cover 150 can be similarly attached to the top of the strap 60 with the reusable fastener 50 and the strap attached about the steering wheel post/column with the card holder 170 easily retrievable by the driver while remaining visible to law enforcement officers approaching the vehicle.

Figure 11A:
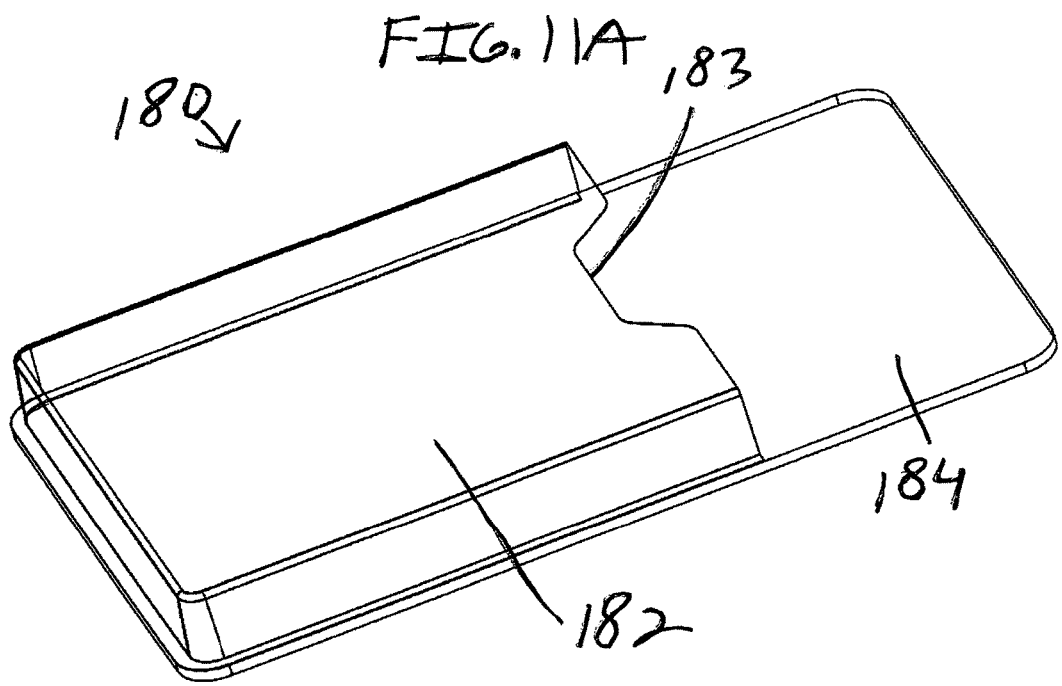
FIG. 11A is a perspective front view of a third base cover sleeve with lower front wall and recess.
Figure 11B:
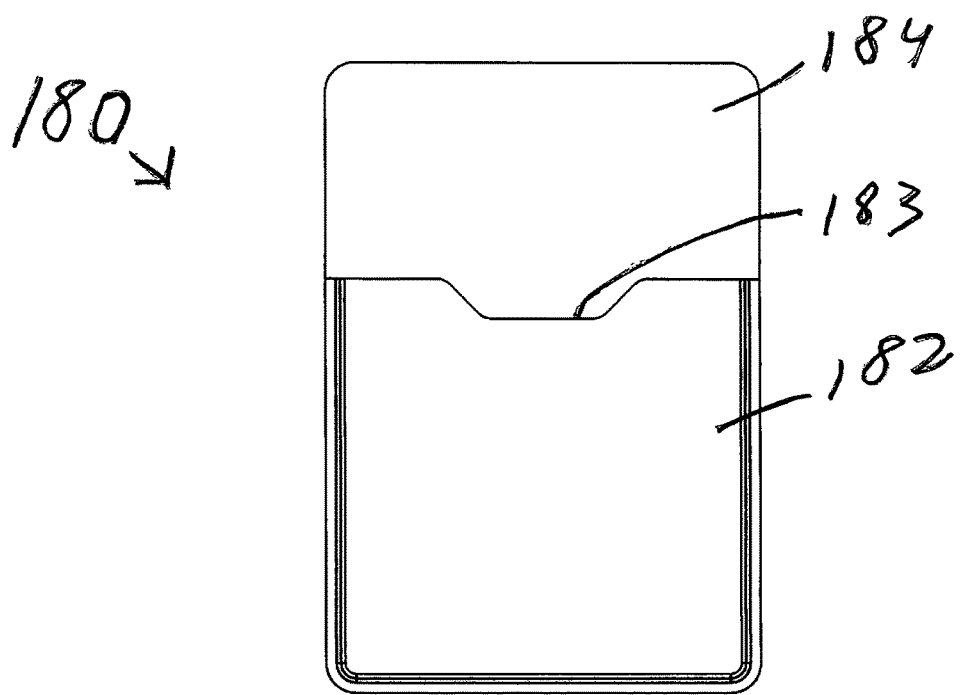
FIG. 11B is a front view of the third base cover sleeve of FIG. 11A.

FIG. 11A is a perspective front view of a third base cover sleeve 180 with lower front wall 182 and recess 183 and back wall 184. FIG. 11B is a front view of the third base cover sleeve 180 of FIG. 11A. The lower front wall 182 allows for the stored card holder to be more easily retrievable since it allows the user more surface space on the card holder to be gripped when retrieving the card holders.

FIG. 12A is an exploded view of the closed four card holder 170 of FIG. 9B about to be inserted into the third base cover sleeve 180 of FIGS. 11A-11B. FIG. 12B is an assembled perspective view of the closed four card holder 170 inserted into the third base cover sleeve 180 of FIG. 12A.

The invention can be packaged in a kit which can includes the card holder having sleeves for a driver's license, vehicle insurance card and vehicle registration card to remain visible, along with a base case (sleeve) to put the card holder into. The kit can include a strap and a reusable fastener which allows for attaching the card holder and base cover on a top of the strap, so that the strap can be wrapped about a steering wheel post/column with the card holder and base cover on top of the steering wheel post/column to allow for easy retrieval while keeping the card holder and base cover continuously visible to someone outside the driver's window of the vehicle.

The kit can come with a safety instructions card providing safety tip instructions to the driver of what to do when an officer pulls over or stops the vehicle. The safety tip information to the driver can include, but not be limited to the following instructions:

1. The driver needs to pull over their vehicle as quickly and safely as possible once a law enforcement officer wishes to stop their vehicle. If already stopped, the driver must not attempt to move their vehicle.

2. The driver and their passengers need to lower their vehicle windows.

3. The driver needs to place both their hands on top of the steering wheel. The front passenger needs to place both their hands on the dashboard. Any rear passengers must also place their hands on the seat back in front of them so that their hands remain completely visible.

4. The driver and all passengers must stay inside the vehicle and not leave.

5. The driver and all passengers need to follow and obey all instructions by the law enforcement officers, and NOT argue and NOT fight with the officers.

6. The driver needs to communicate to the officers that their identification information (drivers license, vehicle registration and vehicle insurance) are located in the card holder that is in the sleeve (case) on the steering wheel column (or on the dashboard), and request permission to remove the card holder to access their identification information.

7. The driver and all passengers need to communicate with the officers if they have any weapons in the vehicle, such as but not limited to firearms, etc. and if they have a firearm permit.

8. The driver and passengers must continue to obey and follow the officer's directions and requests, and continue to not argue and not fight with the officers until the officer allows them to leave.

Another version of the safety tip instructions that can be provided to the driver can include the following placed on a card that can be placed in the safety labelled sleeve in the holder. On the front of the card can be the following instructions:

Traffic Stop Dos

1.) Pull over in a safe, well-lit area, preferably where you won't disrupt the flow of traffic. Then turn on your light-if it's a nighttime bust-to keep the cop's suspicions at bay. If you spend too much time creeping along until you find this perfect pull-over locale, you could agitate the law enforcement officer or cause him to think you're a sketchball. Be reasonable.

2.) Roll down your window completely: cracking the window only enough to show your beady eyes will certainly fire a red flag.

3.) Place both hands on the steering wheel until instructed to retrieve your license, registration, insurance card, etc. This tells the officer his safety is on your mind, even though you might be thinking, "Aw shucks, a ticket? What's a good excuse that would justify screaming down the road at 30 miles over the speed limit?"

4.) Politely answer the cop's questions without being evasive or deceitful. In fact, it's best to be cooperative, reverting back to what you learned in elementary school: If you treat others kindly and with respect, you decrease your chances of a smack down. You'll be given an informal "attitude test," and failing it could mean getting popped with a costly traffic ticket, or two, or three.

5.) Update the cop with any address or name changes on the documentation you provide. This is one of the few times you want to offer up additional info without being prompted. Otherwise, maintain your right to be silent and only answer what's being asked of you. Nervously blathering on can incriminate you further.

On the back of the safety tips card can be the following:
Traffic Stop Don'ts
1.) Don't get out of your car. Statistics show the more reasons you give police officers to reach for their guns, the less likely you'll drive off into the sunset with only a warning.
2.) Don't make quick or evasive movements, even if you're simply reaching for your purse, glove box, whatever. First wait until asked for documentation, and then move at a normal pace to retrieve it. Avoid lunging across or digging under the seat as it may cause the officer to believe you're reaching for a weapon or hiding something. That usually ends poorly with a gun drawn (cop) and an overwhelming feeling of fear (you).
3.) Don't name drop other officers or the police chief, don't try to funny and don't spout off your constitutional rights. Chatting it up gets you nowhere, and could actually annoy the police officer. "We know you are 'best friends' with the chief, and that you play cards on a weekly basis. It must be a card room that can fill Vegas," quips former Maryland cop Tod Burke. He says most people talk themselves into a ticket, rather than talking themselves out of one.
4.) Don't say, "I wasn't speeding," or "I was just keeping up with traffic." And whatever you do, don't shriek, "You can't give me a ticket." Few comments get pen to paper faster.
5.) Don't consent to a vehicle search. While you have the right to refuse consent, a smart cop might find another way to legally search your car. But at least that search didn't come by way of consent. If you do get pooped for party favors, don't say, "The drugs aren't mine." This rarely gets followed by, Oh OK, next time tell your friends to stash their hundred pounds of pot elsewhere."
6.) No texting while driving.

When not being used inside the vehicle, the driver can pull the card holder out and use it as bill fold to be placed in their pocket or pocket book, and the like. The card holder can also be used as a wallet to hold money, credit cards, etc.

Although the invention is described as being mounted to a steering column, the novel invention can be mounted to a dashboard top surface, front surface, vehicle inside door, or other interior surfaces, which are within easy reach of the driver, and remain visible to a law enforcement officer approaching the vehicle.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A vehicle storage container for storing and providing easy to retrieve driver identification documents, consisting in combination of:
a plurality of card shaped transparent sleeves, each sleeve having closed sides and a closed bottom and a single open top end, the plurality of sleeves being hinged to one another along each closed bottom, each of the sleeves being used for holding the driver identification documents, and a tab attached to and extending out from each single open top end of each of the sleeves;
a single cover flap consisting of one side edge hinged to one of the sleeves, for folding about a front side of the plurality of sleeves, and a transparent plastic magnifying lens for use in enlarging the driver identification documents when any of the driver identification documents are removed from the sleeves,
a single base holder consisting of closed sides, a closed bottom end and a single opposite open end for accessing inside of the holder, a front wall and a rear wall, the front wall having a shorter height portion than the rear wall, wherein the hinged closed bottoms of the plurality of sleeves in a folded generally flat position with the cover flap folded over the front side of the plurality of sleeves is inserted into the open end of the base holder, so that the tab is exposed from the open end of the base holder, and the plurality of sleeves in the folded generally flat position with the cover flap folded is completely removable from the base holder by the tab; and
a strap for attaching the base holder about a steering wheel post so that the base holder is on top of the steering wheel post inside and is safely visible from outside of the vehicle, and so that a vehicle driver hands retrieving the plurality of card shaped sleeves are adapted to be safely visible from outside of the vehicle.

2. The vehicle storage container of claim 1, wherein the plurality of sleeves includes:
a bifold having two sleeves; and
the tab extending from an open end of one of the two sleeves for allowing the bifold to be pulled out of the base holder.

3. The vehicle storage container of claim 1, wherein the plurality of sleeves includes:
four sleeves, for each holding one of the driver identification documents; and
a safety card providing instruction information after being stopped by law enforcement.

4. The vehicle storage container of claim 1, wherein the strap includes:
a first end with hooks; and
a second end with loops, for allowing the strap to adjust to different diameter steering wheel posts.

5. The vehicle storage container of claim 1, wherein the strap includes:
a first end with a length adjustment buckle; and
a second free end for insertion into the buckle for allowing the strap to be length adjustable to different diameter steering wheel posts.

6. The vehicle storage container of claim 1, wherein the open end of the base holder is perpendicular to a longitudinal axis of the strap.

7. The vehicle storage container of claim 1, wherein the open end of the base holder is parallel to a longitudinal axis of the strap.

8. The vehicle storage container of claim 1, further comprising:
a reusable fastener for allowing the base holder to be removed from the strap, so that the base holder with the plurality of sleeves can be removed by the driver when the vehicle is parked.

9. The vehicle storage container of claim 8, wherein the reusable fastener includes hook and loop fasteners.

10. The vehicle storage container of claim 8, wherein the reusable fastener includes snaps.

11. The vehicle storage container of claim 8, wherein the reusable fastener includes: a self-sticking material.

* * * * *